C. M. CAMERON.
COMPUTING SCALE.
APPLICATION FILED DEC. 10, 1910.
1,004,363.
Patented Sept. 26, 1911.
4 SHEETS—SHEET 3.
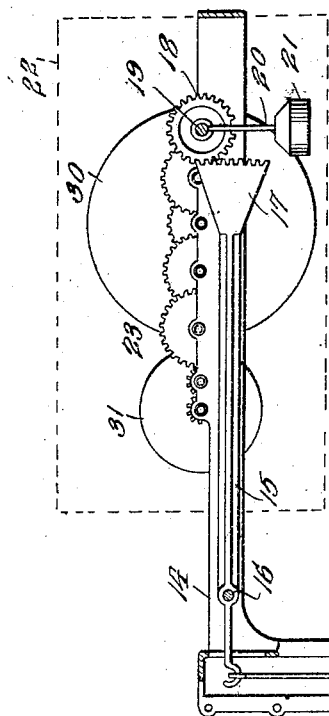
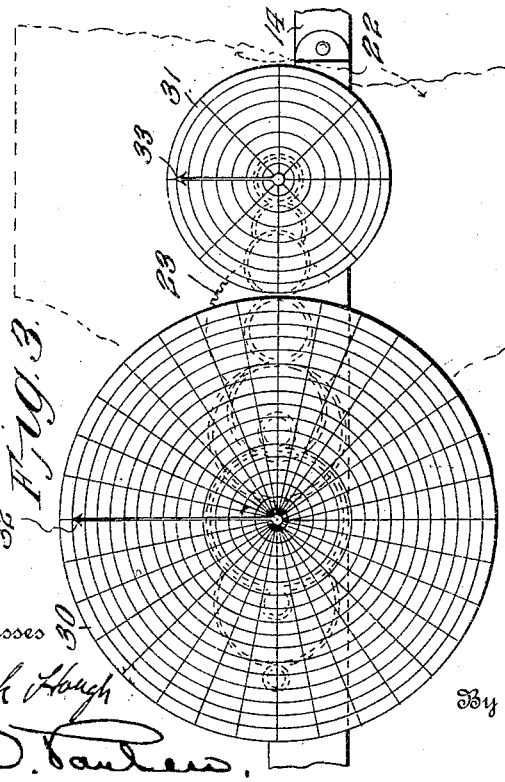
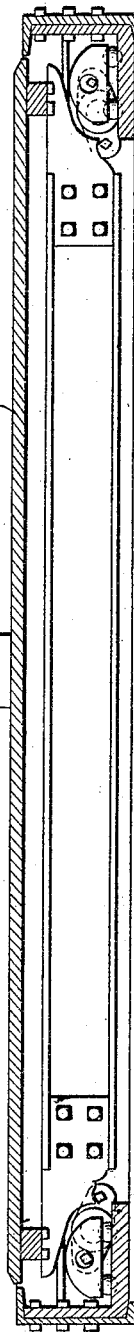
Witnesses
Frank Hough
Inventor
Clyde M. Cameron,
By Victor J. Evans
Attorney C. M. CAMERON.
COMPUTING SCALE.
APPLICATION FILED DEC. 10, 1910.
1,004,363.
Patented Sept. 26, 1911.
4 SHEETS—SHEET 4.
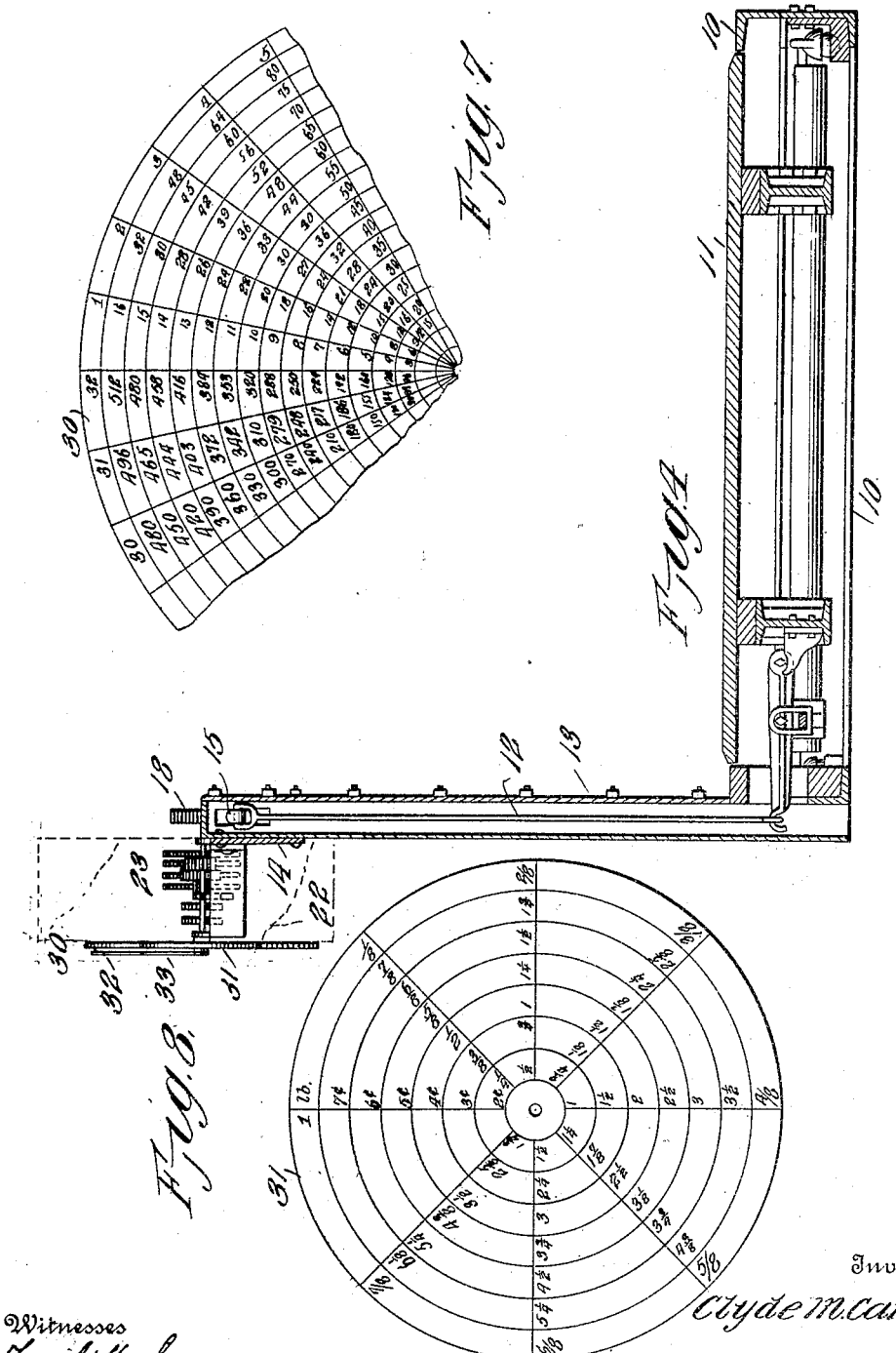

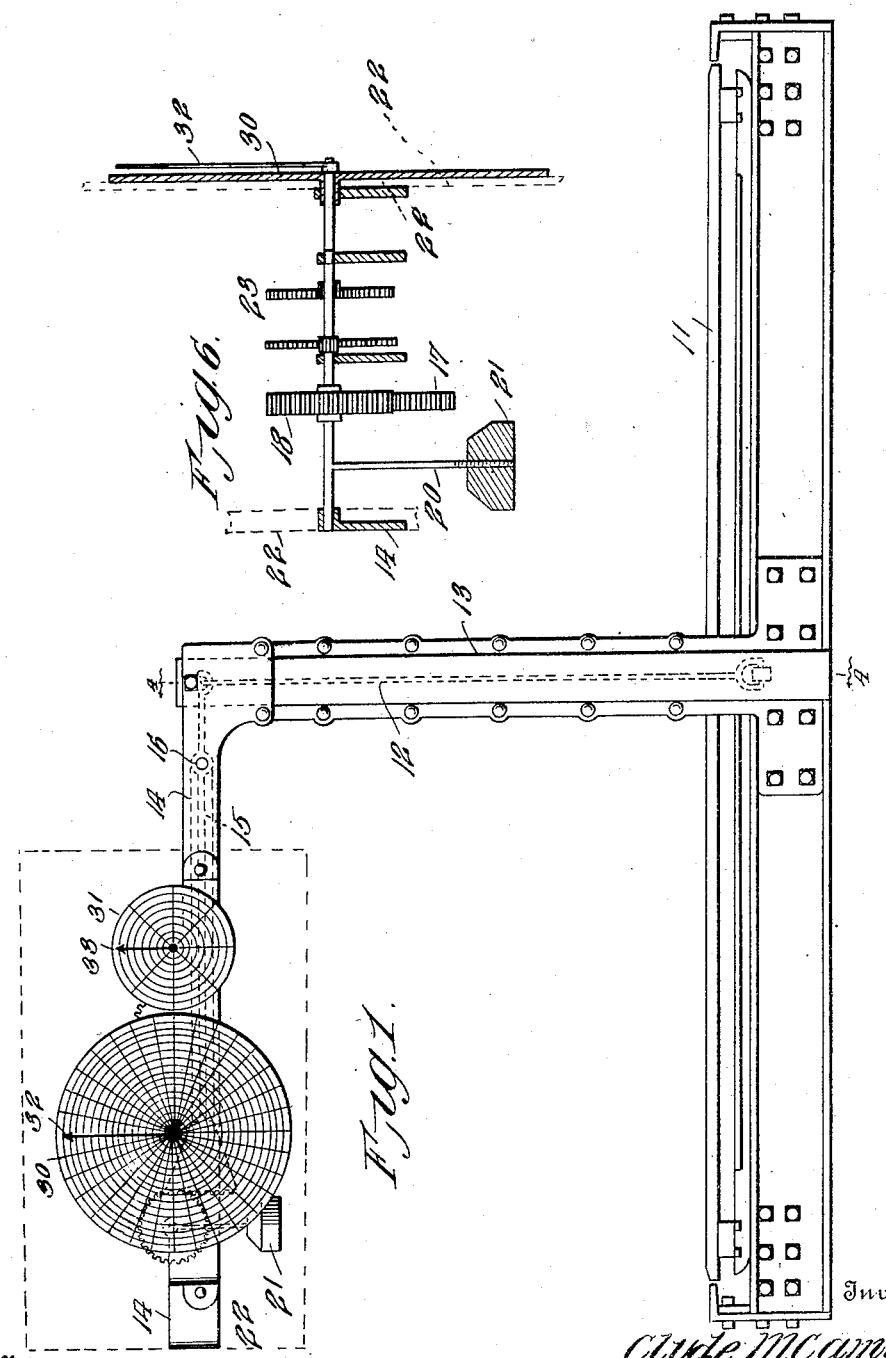

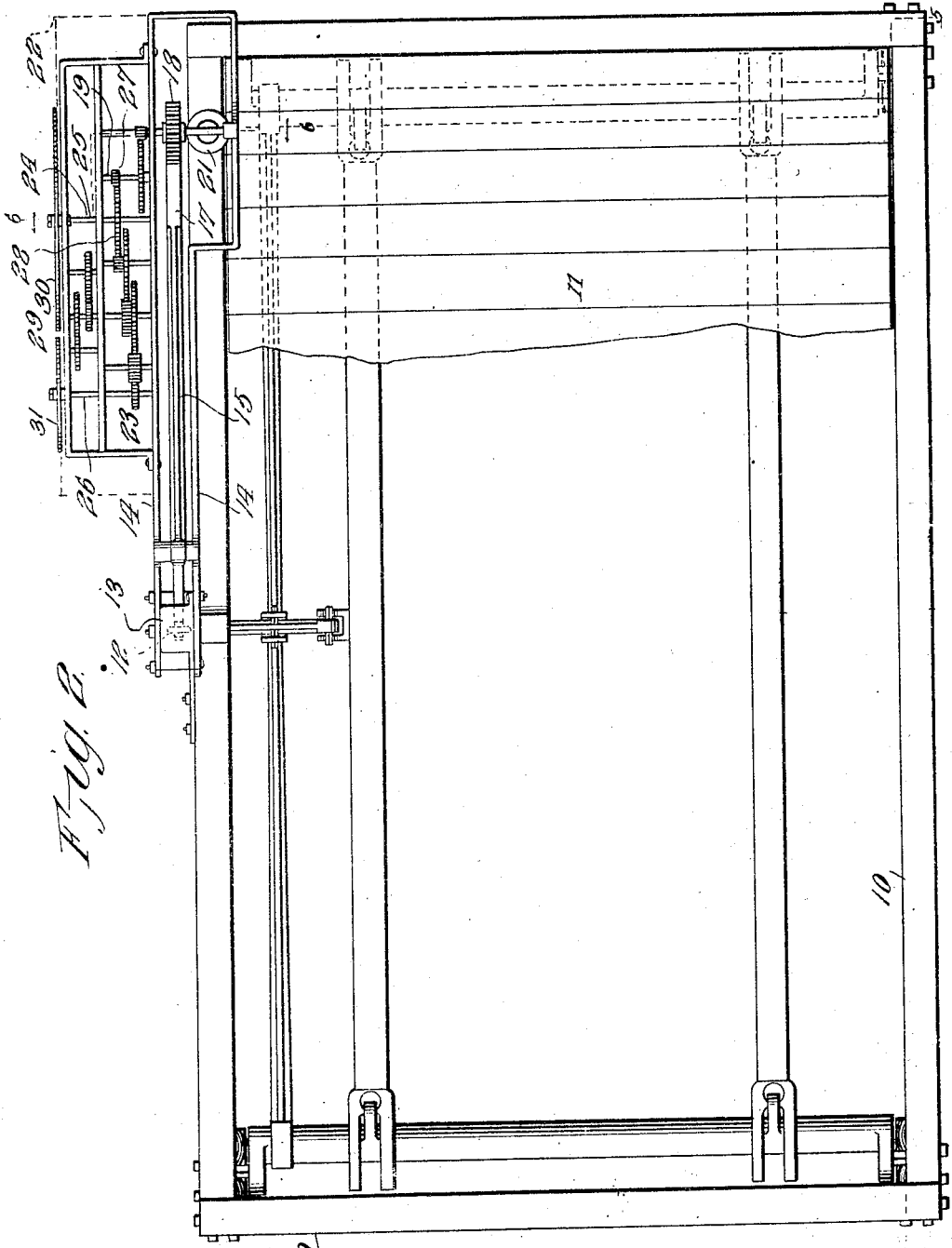

UNITED STATES PATENT OFFICE.

CLYDE M. CAMERON, OF SIMMONS, TEXAS, ASSIGNOR OF ONE-THIRD TO JIM M. JOHNSON AND ONE-THIRD TO DANIEL L. CAMERON, BOTH OF SIMMONS, TEXAS.

COMPUTING-SCALE.

1,004,363.   Specification of Letters Patent.   Patented Sept. 26, 1911.

Application filed December 10, 1910. Serial No. 596,625.

*To all whom it may concern:*

Be it known that I, CLYDE M. CAMERON, a citizen of the United States, residing at Simmons, in the county of Live Oak and State of Texas, have invented new and useful Improvements in Computing-Scales, of which the following is a specification.

The invention relates to scales, and more particularly to the class of computing scales.

The primary object of the invention is the provision of a scale in which the total number of pounds of material placed thereon may be determined, and simultaneously the price for the aggregate number of pounds computed by the scales.

Another object of the invention is the provision of a scale in which material when placed thereon may be weighed, whereby its weight by the pound or a fraction thereof may be readily and easily determined, and at the same time, the price for the aggregate number of pounds or a fraction thereof may be computed, thus enabling the seller and buyer of the material to accurately determine the weight and price of such material, thereby obviating the practice of fraud between said seller and buyer.

A further object of the invention is the provision of a scale in which material may be automatically weighed and the price per pound of said material computed or a fraction less than a pound, so that the seller may accurately and quickly determine the total weight of the material and simultaneously the price thereof.

A still further object of the invention is the provision of a scale of this character which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a front elevention of a scale constructed in accordance with the invention. Fig. 2 is a top plan view thereof. Fig. 3 is an enlarged plan view of the computing dial. Fig. 4 is a vertical sectional view on the line 4—4 of Fig. 1. Fig. 5 is a sectional view on the line 5—5 of Fig. 2. Fig. 6 is a sectional view on the line 6—6 of Fig. 2. Fig. 7 is a fragmentary plan view of one of the graduated dials. Fig. 8 is a plan view of another one of the graduated dials.

Similar reference characters indicate corresponding parts throughout the several views of the drawings.

Referring to the drawings by numerals, the scale herein shown comprises a base frame 10 which is of the usual well-known type, on which is supported a weighing platform 11, the latter being of the ordinary construction and is supported by any suitable number of scale levers which are connected in the ordinary manner with a pull rod 12, the latter working within an ordinary post 13 rising from one end of the platform frame 10, the upper end of the post 13 being provided with a right angularly disposed open frame 14, which is secured to the post in any suitable manner.

Disposed within the open frame 14 is the ordinary scale beam 15, the same being connected near one end to the frame by means of a pivot 16. Also connected to this beam 15 is the pull rod 12. Integral with or secured to the free end of the scale beam 15 is a sector-shaped toothed rack 17, the latter meshing with a cog pinion 18 fixed to a horizontally disposed rotatable shaft 19, the latter being journaled in the side bars of the open frame 14, whereby on depressing the platform 11, the scale beam 15 will be caused to rock, thereby rotating the shaft 19 for a purpose, as will be hereinafter more fully described.

Fixed to the shaft 19 and depending therefrom is a pendulum arm 20, the free end of which has fixed thereto a weight 21 which effects the gravitation of the pendulum arm 20 to normal perpendicular position, but is capable of being swung to either side of its normal perpendicular position when the scale is being operated.

Suitably fixed to one side of the open frame 14 is a casing 22 which may be of any desirable construction, and in which are arranged independent trains of clock gears 23, the same being supported by the usual clock arbors 24, and one of these trains as adapted to actuate a main arbor 25, while the other train is adapted to actuate an auxiliary arbor 26, the trains 23 being rotated through the medium of a gear 27, the latter meshing with a pinion 28 fixed to the main arbor 24, the gear 27 being fixed to the horizontal shaft 19, whereby on the rotation of the latter, the said trains of gears will be simultaneously actuated for a purpose, as will be hereinafter more fully described.

On the outer face of the casing 22 is fixed a dial 29, on which are suitably printed or otherwise marked independent circular charts 30 and 31, the chart 30 being disposed concentrically with respect to the main arbor 24, while the chart 31 is arranged concentrically with respect to the auxiliary arbor 26. The chart 30 is suitably marked with a graduated scale representing different prices for a unit of weight, and also different units of weight. Also, the chart 31 is provided with a graduated scale showing fractions of units of weight and the price per fraction of the unit of weight.

Secured to the main arbor is an indicator hand or pointer 32. Also secured to the auxiliary arbor 26 is an indicator hand or pointer 33, these pointers or hands being adapted to sweep or traverse over their respective charts 30 and 31 when the scale is being operated, so that on the weighing of material, both the unit of weight and the price per unit may be computed.

In practice, the article whose value and weight is to be computed is placed upon the platform 11, which instantly causes the rising of the scale beam 15, thereby rotating the pendulum carrying shaft 19 which causes the actuation of the trains of gears 24 which effects the turning of the indicator hands or pointers 32 and 33, so that the same will sweep over the charts 30 and 31 to predetermined points thereon for indicating the aggregate number of pounds or faction thereof, and simultaneously the price per pound and the price for the units of weight at which the article is sold. It is to be understood, of course, that the charts 30 and 31 may be altered by way of changing the graduated scales thereon, so that an increased or decreased number of pounds may be computed, and likewise the price per unit or fraction thereof of the weight of the article to be sold.

What is claimed is.

1. A scale of the class described, comprising a base, a post rising therefrom, a frame supported on said post, a scale beam pivoted in said frame, a platform mounted upon the base and having connection with the scale beam, a casing fixed to the frame, trains of gearing rotatably mounted in the casing, a rotatable shaft mounted in the frame and having connection with the trains of gearing, a toothed sector formed on the free end of the said beam, a gear fixed to said shaft and intermeshing with the said sector, a weighted pendulum fixed to said shaft, a dial having independent charts provided with graduated scales, and pointers actuated by the trains of gears and adapted to traverse the said scales on the dial.

2. A scale of the class described, comprising a support, a platform carried thereby, a rocking scale beam above said support and having connection with said platform, a rotatable shaft having a gear, a toothed sector carried by the beam and intermeshing with the gear, a weighted pendulum fixed to the said shaft, a casing connected with the support, a train of gearing journaled in said casing and having connection with the said shaft, a dial carried by the casing and having a graduated scale thereon, and a pointer connected with the train of gearing and adapted to traverse the said graduated scale.

3. In a computing scale, a support, a platform carried by said support, an upright rising from said support, a frame connected with said upright, a rotatable shaft journaled in said frame and having a weighted pendulum, a rocking beam connected with said platform and supported in the frame, a gear fixed to said shaft, a toothed sector fixed to said beam, and intermeshing with the gear, a casing fixed to said frame, a main arbor journaled in said casing, an auxiliary arbor journaled in said casing, independent trains of gearing operated by said shaft and actuating said main and auxiliary arbors, charts carried by the casing and disposed concentrically with respect to the said main and auxiliary arbors, and pointers carried by said arbors.

In testimony whereof I affix my signature in presence of two witnesses.

CLYDE M. CAMERON.

Witnesses:
CHAS. H. WILLIAMS,
JOHN M. BOWEN.